(No Model.)
V. W. BLANCHARD.
FURNACE WALL.
No. 413,905. Patented Oct. 29, 1889.
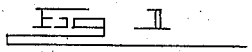
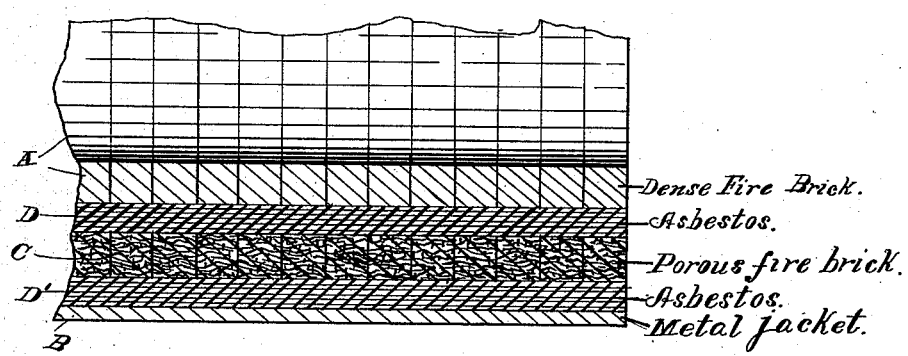
Dense Fire Brick.
Asbestos.
Porous fire brick.
Asbestos.
Metal jacket.
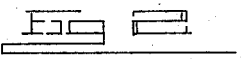
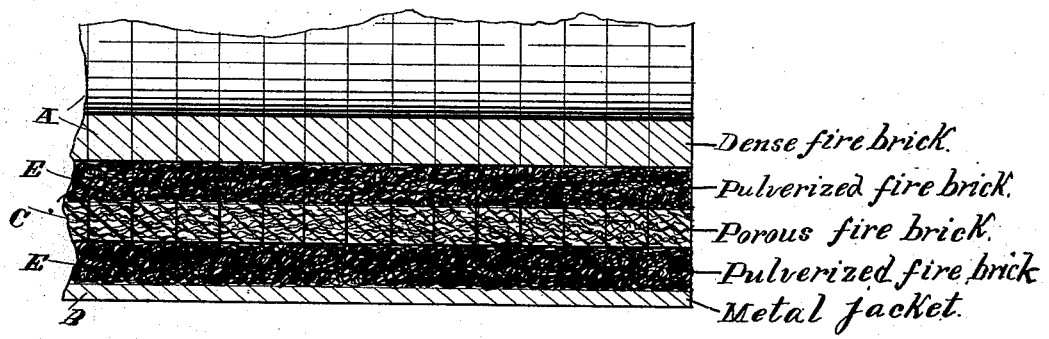
Dense fire brick.
Pulverized fire brick.
Porous fire brick.
Pulverized fire brick.
Metal jacket.
Witnesses:
C. W. Sevill
A. E. Dowell
Inventor
Virgil W. Blanchard
by T. S. Alexander
Attorney.

UNITED STATES PATENT OFFICE.

VIRGIL W. BLANCHARD, OF NEW YORK, N. Y., ASSIGNOR TO JOSEPH A. DAVIS, OF SAME PLACE.

FURNACE-WALL.

SPECIFICATION forming part of Letters Patent No. 413,905, dated October 29, 1889.

Application filed April 9, 1889. Serial No. 306,534. (No model.)

*To all whom it may concern:*

Be it known that I, VIRGIL W. BLANCHARD, of New York, in the county of New York and State of New York, have invented certain new and useful Improvements in Furnace-Walls; and I do hereby declare that the following is a full, clear, and exact description thereof, reference being had to the accompanying drawings, and to the letters of reference marked thereon, which form part of this specification, in which—

Figure 1 is a vertical section showing a furnace-lining which is constructed according to my invention, having asbestus paper and porous fire-brick interposed between the lining of the furnace and an outer metal jacket. Fig. 2 shows pulverized material on each side of a porous fire-brick, an outer metallic jacket, and an internal fire-brick wall.

This invention is designed for preventing undue radiation of heat from furnace-walls; and the nature of my invention consists in a heat-non-conducting wall which is constructed as will be fully understood from the following description, when taken in connection with the annexed drawings.

The non-conducting wall which I am about to describe is designed especially for such furnaces as are subjected to a very high degree of heat wherein the internal walls are raised to a state of incandescence. To prevent the radiation of heat from these walls, I construct the internal wall A of dense fire-bricks which have been subjected to the highest possible degree of heat in their manufacture. Now it will be observed that I have a stratum between the internal wall A, or wall proper of the furnace, and the outer jacket of loose material, which of itself is practically indestructible by heat and which allows air to freely circulate through it. This non-conducting stratum is retained in its place by the metal jacket or casing B.

Instead of using asbestus paper on opposite sides of the porous fire-bricks, I may use pulverized fire-brick E, as shown in Fig. 2, which I deem a fair equivalent for asbestus packing.

In Fig. 1 I show a furnace-wall which is composed of the dense fire-brick lining A, a stratum D, composed of layers of asbestus paper, a stratum composed of porous fire-brick C, another stratum composed of layers of asbestus paper D', and a metal jacket B.

An essential feature of my invention is the employment of porous fire-brick in combination with dense fire-brick and asbestus paper, the porous fire-brick being made by mixing straw with clay and burning out the straw in the process of burning the brick, thereby leaving air-circulating passages in and through the bricks.

Having described by invention, I claim—

1. A wall for furnaces and other purposes, composed of an internal lining of dense fire-brick, an external metal jacket, and intermediate layers of porous fire-bricks and refractory substance, substantially as described.

2. A furnace-wall composed of dense fire-brick lining, a layer of loose refractory material, a layer of porous fire-brick made as described, another layer of loose refractory material, and a metal jacket, substantially as described.

In testimony that I claim the foregoing as my own I affix my signature in presence of two witnesses.

VIRGIL W. BLANCHARD.

Witnesses:
A. E. DOWELL,
P. L. BROOKS.